June 10, 1952 G. H. COOK 2,600,208
FOUR COMPONENT OBJECTIVES WITH SECOND COMPONENT
A CONVERGENT CEMENTED DOUBLET HAVING A
DISPERSIVE INTERNAL CONTACT SURFACE
Filed June 5, 1950
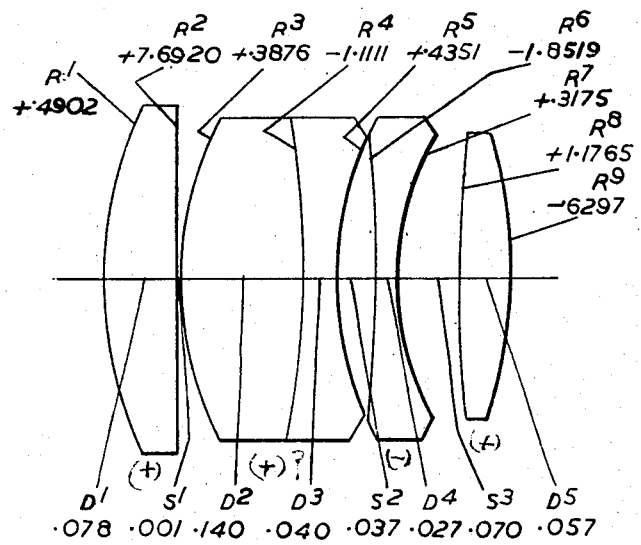
Inventor
Gordon H. Cook
By
Emery, Holcombe & Blair
Attorney Patented June 10, 1952

2,600,208

UNITED STATES PATENT OFFICE 2,600,208

FOUR COMPONENT OBJECTIVES WITH SECOND COMPONENT A CONVERGENT CEMENTED DOUBLET HAVING A DISPERSIVE INTERNAL CONTACT SURFACE

Gordon Henry Cook, Leicester, England, assignor to Taylor, Taylor & Hobson Limited, Leicester, England, a company of Great Britain Application June 5, 1950, Serial No. 166,262
In Great Britain July 14, 1949

20 Claims. (Cl. 88—57)

This invention relates to optical objectives for photographic or other purposes of the kind corrected for spherical and chromatic aberrations, coma, astigmatism and field curvature and comprising four air-spaced components of which the front two are convergent, the third divergent and the fourth convergent, the first, third and fourth components being simple. It is to be understood that the terms "front" and "rear" are herein used to indicate the sides of the objective respectively nearer to and further from the longer conjugate, in accordance with the usual convention.

When, in a particular camera, it is desired to use an objective of larger focal length than is usual for the camera, a higher degree of correction for the aberrations is required over a reduced angular field. To meet this requirement, it is customary to make the overall axial length of the objective from the front surface to the rear surface greater than for an objective of the same focal length for the normal angular field. This usually results in an increased distance from the front surface to the back focal plane exceeding the focal length, but this increase gives rise to practical difficulties in some photographic applications. The so-called telephoto lens construction, sometimes employed to obviate this difficulty does not, however, provide sufficiently critical definition, when made in long focal lengths, at the apertures and angular fields with which the present invention is concerned.

The present invention has for its object to provide an objective well corrected for an aperture greater than, say, F/3 over a semi-angular field of at least 10°, wherein the distance from the front surface to the back focal plane is not greater than an amount approximately equal to the focal length.

In the objective according to the invention the convergent second component is in the form of a cemented doublet having a dispersive internal contact surface concave to the front, and the focal lengths of the four components (counting from the front) bear ratios to the equivalent focal length of the whole objective respectively lying between 0.7 and 1.1, 2.0 and 10.0, 0.3 and 0.5, and 0.4 and 0.8, whilst the focal length of the group consisting of the front three components (whether divergent or convergent) is greater than 5.0 times such equivalent focal length.

Preferably, the overall axial length of the objective from the front surface of the front component to the rear surface of the rear component lies between one-third and two-thirds of the equivalent focal length, the axial thickness of the doublet lying between an eighth and a quarter of such equivalent focal length. The axial distance from the front surface of the front component to the rear surface of the third component preferably lies between .25 and .40 times the equivalent focal length of the objective.

The Abbé V number of the material of the convergent front component conveniently exceeds that of the divergent third component by at least 25 and that of the convergent rear component by at least 20.

The Abbé V number of the material of the front element of the doublet conveniently exceeds that of the rear element thereof by at least 20.

The convergent doublet is preferably of strongly meniscus form with its outer surfaces convex to the front, the radius of curvature of the rear surface lying between one-third and two-thirds of the equivalent focal length of the objective.

The radius of curvature of the internal contact surface of the doublet is preferably such that the expression $(N^1-N)/R$, representing the optical power of the surface, has a numerical value lying between .025 and .15 times the reciprocal of the equivalent focal length of the objective, where N and $N^1$ are the mean refractive indices of the materials respectively of the front element and of the rear element and R is the radius of curvature of the contact surface.

The front surface of the divergent third component is preferably concave to the front with radius of curvature greater than the equivalent focal length of the objective. The radius of curvature of the rear surface of the third component is preferably such that the power of the surface $(1-N)/R$ has a numerical value lying between 1.75 and 2.7 times the reciprocal of the equivalent focal length of the objective, where N is the mean refractive index of the material of the third component and R is the radius of curvature of its rear surface.

Conveniently the front surface of the rear component is convex to the front with radius of curvature greater than three-quarters of the equivalent focal length of the objective and less than twice such focal length.

A preferred construction of objective according to the invention is illustrated in the accompanying drawing, and numerical data therefor are given in the following table, in which $R_1R_2$ . . . represent the radii of curvature of the surfaces of the objective, the positive sign indicating that the surface is convex to the front and the negative sign that it is concave thereto, $D_1 D_2 \ldots$ represent the axial thicknesses of the elements of the objective, and $S_1 S_2 S_3$ represent the axial spacings between the components. The table also gives the mean refractive indices $n_D$ for the D-line and the Abbé V numbers of the materials used for the various elements.

| Equivalent focal length 1.000. Relative aperture F/2.6. | | | |
|---|---|---|---|
| Radius | Thickness or Air Separation | Refractive Index $n_D$ | Abbé V Number |
| $R_1 = +.4902$ | $D_1 = .078$ | 1.589 | 61.2 |
| $R_2 = +7.6920$ | $S_1 = .001$ | | |
| $R_3 = +.3876$ | $D_2 = .140$ | 1.589 | 61.2 |
| $R_4 = -1.1111$ | $D_3 = .040$ | 1.667 | 35.6 |
| $R_5 = +.4351$ | $S_2 = .037$ | | |
| $R_6 = -1.8519$ | $D_4 = .027$ | 1.700 | 30.3 |
| $R_7 = +.3175$ | $S_3 = .070$ | | |
| $R_8 = +1.1765$ | $D_5 = .057$ | 1.717 | 29.4 |
| $R_9 = -.6297$ | | | |

In this example, the back focal plane is at a distance .566 times the equivalent focal length of the objective behind the rear surface $R_9$, so that the total axial distance from the front surface $R_1$ to the back focal plane is 1.016 times such equivalent focal length, the overall axial length of the objective itself being .450 times such focal length.

The ratio of the focal length of the front component to the equivalent focal length of the whole objective is .89, and the corresponding ratios for the second, third and fourth components are respectively 5.42, .39 and .58. The group comprising the first three components is convergent and has a focal length 375.5 times the equivalent focal length of the whole objective.

In the doublet second component, the cemented contact surface is dispersive, and the optical power of this surface, represented by the ratio $(N^1 - N)/R$ is .070 times the power of the whole objective.

The insertion of equals (=) signs in the radius column of the table, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the table may have to be treated as negative for some calculations as is well understood in the art.

The optical power of the rear surface of the divergent third surface is 2.20 times the power of the whole objective, such surface being dispersive.

This example is well corrected for the various aberrations over a semi-angular field of about 10°.

What I claim as my invention and desire to secure by Letters Patent is:

1. An optical objective, corrected for spherical and chromatic aberrations, coma, astigmatism, and field curvature, and comprising four components in axial alignment, of which the front component is simple and convergent, the second component consists of a convergent cemented doublet having a dispersive internal contact surface concave to the front, the third componet is simple and divergent, and the rear component is simple and convergent, the focal lengths of the four components (counting from the front) bearing ratios to the equivalent focal length of the whole objective respectively lying between 0.7 and 1.1, 2.0 and 10.0, 0.3 and 0.5, and 0.4 and 0.8, whilst the focal length of the group consisting of the front three components is greater than 5.0 times such equivalent focal length.

2. An optical objective as claimed in claim 1, in which the overall axial length of the objective from the front surface of the front component to the rear surface of the rear component lies between one-third and two-thirds of the equivalent focal length of the objective, the axial thickness of the doublet lying between an eighth and a quarter of such equivalent focal length.

3. An optical objective as claimed in claim 2, in which the axial distance from the front surface of the front component to the rear surface of the third component lies between .25 and .40 times the equivalent focal length of the objective.

4. An optical objective as claimed in claim 1, in which the axial distance from the front surface of the front component to the rear surface of the third component lies between .25 and .40 times the equivalent focal length of the objective.

5. An optical objective as claimed in claim 1, in which the front surface of the rear component is convex to the front and has radius of curvature greater than three-quarters of the equivalent focal length of the objective and less than twice such equivalent focal length.

6. An optical objective, corrected for spherical and chromatic aberrations, coma, astigmatism and field curvature, and comprising four components in axial alignment, of which the front component is simple and convergent, the second component consists of a convergent cemented doublet having a dispersive internal contact surface concave to the front and having its rear surface convex to the front with radius of curvature between one-third and two-thirds of the equivalent focal length of the objective, the third component is simple and divergent, and the rear component is simple and convergent, the focal lengths of the four components (counting from the front) bearing ratios to the equivalent focal length of the whole objective respectively lying between 0.7 and 1.1, 2.0 and 10.0, 0.3 and 0.5, and 0.4 and 0.8, whilst the focal length of the group consisting of the front three components is greater than 5.0 times such equivalent focal length.

7. An optical objective as claimed in claim 6, in which the optical power of the dispersive contact surface in the doublet lies between .025 and .15 times the equivalent power of the objective.

8. An optical objective as claimed in claim 7, in which the overall axial length of the objective from the front surface of the front component to the rear surface of the rear component lies between one-third and two-thirds of the equivalent focal length of the objective, the axial thickness of the doublet lying between an eighth and a quarter of such equivalent focal length.

9. An optical objective as claimed in claim 8, in which the axial distance from the front surface of the front component to the rear surface of the third component lies between .25 and .40 times the equivalent focal length of the objective.

10. An optical objective as claimed in claim 6, in which the overall axial length of the objective from the front surface of the front component to the rear surface of the rear component lies between one-third and two-thirds of the equivalent focal length of the objective, the axial thickness of the doublet lying between an eighth and a quarter of such equivalent focal length, and the axial distance from the front surface of the front component to the rear surface of the third component lies between .25 and .40 times the equivalent focal length of the objective.

11. An optical objective as claimed in claim 6, in which the front surface of the rear component is convex to the front and has radius of curvature greater than three-quarters of the equivalent focal length of the objective and less than twice such equivalent focal length.

12. An optical objective, corrected for spherical and chromatic aberrations, coma, astigmatism and field curvature, and comprising four components in axial alignment, of which the front component is simple and convergent, the second component consists of a convergent cemented doublet having a dispersive internal contact surface concave to the front, the third component is simple and divergent, and has its front surface concave to the front with radius of curvature greater than the equivalent focal length of the objective, and the rear component is simple and convergent, the focal lengths of the four components (counting from the front) bearing ratios to the equivalent focal length of the whole objective respectively lying between 0.7 and 1.1, 2.0 and 10.0, 0.3 and 0.5, and 0.4 and 0.8, whilst the focal length of the group consisting of the front three components is greater than 5.0 times such equivalent focal length.

13. An optical objective as claimed in claim 12, in which the optical power of the rear surface of the divergent third component lies between 1.75 and 2.7 times the equivalent power of the objective.

14. An optical objective as claimed in claim 13, in which the axial distance from the front surface of the front component to the rear surface of the third component lies between .25 and .40 times the equivalent focal length of the objective.

15. An optical objective as claimed in claim 12, in which the overall axial length of the objective from the front surface of the front component to the rear surface of the rear component lies between one-third and two-thirds of the equivalent focal length of the objective, the axial thickness of the doublet lying between an eighth and a quarter of such equivalent focal length.

16. An optical objective as claimed in claim 12, in which the rear surface of the convergent doublet is convex to the front and has a radius of curvature between one-third and two-thirds of the equivalent focal length of the objective.

17. An optical objective as claimed in claim 12, in which the front surface of the rear component is convex to the front and has a radius of curvature greater than three-quarters of the equivalent focal length of the objective and less than twice such equivalent focal length.

18. An optical objective corrected for spherical and chromatic aberrations, coma, astigmatism, and field curvature, and comprising four components in axial alignment, of which the front component is simple and convergent, the second component consists of a convergent cemented doublet having a dispersive internal contact surface concave to the front, the third component is simple and divergent, and the rear component is simple and convergent, the focal lengths of the four components (counting from the front) bearing ratios to the equivalent focal length of the whole objective respectively lying between 0.7 and 1.1, 2.0 and 10.0, 0.3 and 0.5, and 0.4 and 0.8, whilst the focal length of the group consisting of the front three components is greater than 5.0 times such equivalent focal length, the Abbé V number of the material of the first component exceeding that of the third component by at least 25 and that of the fourth component by at least 20, whilst the Abbé V number of the material of the front element of the convergent doublet exceeds that of the rear element thereof by at least 20.

19. An optical objectve, corrected for spherical and chromatic aberrations, coma, astigmatism, and field curvature, and comprising four components in axial alignment, of which the front component is simple and convergent, the second component consists of a convergent cemented doublet having a dispersive internal contact surface concave to the front, the third component is simple and divergent, and the rear component is simple and convergent, such rear component having a focal length between 0.4 and 0.8 times the equivalent focal length of the whole objective, the group consisting of the front three components having axial length from the front surface of the front component to the rear surface of the third component between .25 and .40 times the equivalent focal length of the whole objective and having focal length greater than 5.0 times such equivalent focal length, the Abbé V number of the material of the first component exceeding that of the third component by at least 25 and that of the fourth component by at least 20, whilst the Abbé V number of the material of the front element of the convergent doublet exceeds that of the rear element thereof by at least 20.

20. An optical objective, corrected for spherical and chromatic aberrations, coma, astigmatism, and field curvature, and comprising four components in axial alignment, of which the front component is simple and convergent, the second component consists of a convergent cemented doublet having a dispersive internal contact surface concave to the front, the third component is simple and divergent, and the rear component is simple and convergent, such rear component having a focal length between 0.4 and 0.8 times the equivalent focal length of the whole objective, whilst the focal length of the group consisting of the front three components is greater than 5.0 times such equivalent focal length, the overall axial length of the objective from the front surface of the front component to the rear surface of the rear component lying between one-third and two-thirds of the equivalent focal length of the objective, whilst the axial thickness of the doublet component lies between an eighth and a quarter of such equivalent focal length, the Abbé V number of the material of the first component exceeding that of the third component by at least 25 and that of the fourth component by at least 20, whilst the Abbé V number of the material of the front element of the convergent doublet exceeds that of the rear element thereof by at least 20.

GORDON HENRY COOK.

(References on following page)

REFERENCES CITED

The following references are of record in the file of this patent:

UNITED STATES PATENTS

| Number | Name | Date |
|---|---|---|
| 1,584,271 | Bertele | May 11, 1926 |
| 2,170,428 | Richter | Aug. 22, 1939 |

FOREIGN PATENTS

| Number | Country | Date |
|---|---|---|
| 237,861 | Great Britain | Feb. 11, 1926 |
| 538,653 | Great Britain | Aug. 12, 1941 |
| 575,441 | Great Britain | Feb. 18, 1946 |